United States Patent
Choi

(10) Patent No.: US 7,185,252 B2
(45) Date of Patent: Feb. 27, 2007

(54) MEASUREMENT CIRCUIT AND METHOD FOR SERIALLY MERGING SINGLE-ENDED SIGNALS TO ANALYZE THEM

(75) Inventor: Si-young Choi, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 196 days.

(21) Appl. No.: 11/075,790

(22) Filed: Mar. 8, 2005

(65) Prior Publication Data

US 2005/0235189 A1 Oct. 20, 2005

(30) Foreign Application Priority Data

Apr. 2, 2004 (KR) ............... 10-2004-0022887

(51) Int. Cl.
*G01R 31/28* (2006.01)
(52) U.S. Cl. ....................... 714/732; 714/776
(58) Field of Classification Search .............. 377/47; 702/106, 66; 714/724, 732, 776; 324/210; 29/846

See application file for complete search history.

(56) References Cited

U.S. PATENT DOCUMENTS

| | | | |
|---|---|---|---|
| 6,157,693 A * | 12/2000 | Jayaraman | 377/47 |
| 6,675,117 B2 * | 1/2004 | Adam et al. | 702/106 |
| 6,694,462 B1 * | 2/2004 | Reiss et al. | 714/724 |
| 6,710,594 B2 * | 3/2004 | Eunkyu et al. | 324/210 |
| 6,909,980 B2 * | 6/2005 | Fernando | 702/66 |
| 6,941,649 B2 * | 9/2005 | Goergen | 29/846 |
| 2004/0019458 A1 | 1/2004 | Jang | 702/182 |

* cited by examiner

*Primary Examiner*—David Ton
(74) *Attorney, Agent, or Firm*—Mills & Onello LLP

(57) ABSTRACT

Provided are a measurement circuit and method for serially merging single-ended signals to analyze them. To analyze two differential signals probed from a DUT, that is, DP and DM signals, the measurement circuit detects DP data from which its DC portion has been removed and DM data from which its DC portion has been removed, stores the two data signals in a memory, and then serially merges the two data signals stored in the memory without distorting them. The measurement circuit divides the serially merged signal at a predetermined period and overlaps the divided signals to generate eye diagram data and analysis data including crossover voltages, rising time, falling time and so on.

20 Claims, 5 Drawing Sheets

MEASUREMENT CIRCUIT AND METHOD FOR SERIALLY MERGING SINGLE-ENDED SIGNALS TO ANALYZE THEM

BACKGROUND OF THE INVENTION

This application claims the priority of Korean Patent Application No. 2004-22887, filed on Apr. 2, 2004, in the Korean Intellectual Property Office, the contents of which are incorporated herein in their entirety by reference.

1. Field of the Invention

The present invention relates to signal measurement and, more particularly, a measurement circuit and method for analyzing differential signals generated by a semiconductor device or system.

2. Description of the Related Art

Recently, a high-speed serial data interface has become a standard data interface in mobile application products. Through the high-speed serial data interface, serial data composed of differential signals are transmitted between a personal computer and a liquid crystal display monitor or between a personal computer and a universal serial bus (USB) 2.0 at a high transmission rate. The differential signals used in the high-speed serial data interface include a differential plus (DP) signal and a differential minus (DM) signal. When a transmitting side transmits transmission data in the form of the differential signal, a receiving side extracts the transmission data from a signal obtained by subtracting the DM signal from the DP signal. This is for the purpose of preventing the transmission data from being affected by noise using the fact that the signal obtained by subtracting the DM signal from the DP signal has no noise because the DM signal is simultaneously affected by the noise when the DP signal is affected by the noise.

Among high-speed serial data interface application products, the USB 2.0 is being widely used for mobile applications. When a semiconductor device such as the USB 2.0 is manufactured, "compliance tests" with respect to only some standardized items including a receiving function, transmission jitter, crossover voltage, rising time and falling time are carried out due to various difficulties in tests. In a high speed mode for transmitting 480 MHz data, the differential signals are probed and measured. In a full speed mode for transmitting 12 MHz data, single-ended signals with respect to DP and DM signals are probed and analyzed in a semiconductor device such as the USB 2.0.

FIG. 1 shows signal waveforms displayed by a general measuring instrument, and FIG. 2 is an eye diagram of the two signals of FIG. 1 when the signals are merged in parallel by the general measuring instrument. The general measuring instrument such as an oscilloscope can show two signals, that is, DP and DM signals, probed by a device under test (DUT), such as USB 2.0, simultaneously, as shown in FIG. 1. Furthermore, the general measuring instrument can merge the two signals in parallel to show the merged signal in the eye diagram, as shown in FIG. 2. The eye diagram of FIG. 2 is a signal waveform obtained by dividing the signals of FIG. 1 at a specific period and overlapping the divided signals. The state of the signals shown on the oscilloscope is analyzed through the eye diagram. That is, a degree of jitter in the probed signals is analyzed from the signal waveform of the eye diagram. From portions (A) and (B) of the eye diagram of FIG. 2, a crossover voltage at which a rising edge and a falling edge meet is analyzed. Furthermore, the rising time and falling time of the signals can be known from the rising edge and falling edge of the eye diagram.

In the semiconductor device such as the USB 2.0, a test of full-speed mode single-ended signals can be easily analyzed by the general measuring instrument such as the oscilloscope, as described above. However, the test analysis cannot be carried out in an environment where the test is executed by automated test equipment (ATE). When automated test equipment (ATE) is used, data corresponding to a difference signal between DP and DM signals is stored in a predetermined memory and a test of a high speed mode is analyzed through the stored data. In this case, however, single-ended signals for a full speed mode test cannot be simultaneously shown on a display. Accordingly, a signal test using the eye diagram of the single-ended signals cannot be easily carried out.

SUMMARY OF THE INVENTION

The present invention provides a measurement circuit that generates an eye diagram of single-ended signals output from a DUT to analyze the single-ended signals by serially merging the single-ended signals even when an ATE is used.

The present invention also provides a method of serially merging single-ended signals output from a DUT to generate an eye diagram.

According to an aspect of the present invention, there is provided a measurement method comprising dividing an input DP signal into a DC portion and a digital pulse portion, detecting DP data corresponding to a packet size from the digital pulse portion and outputting the DP data; detecting a voltage level of final time from the DP data and outputting the voltage level as a DP final level; dividing an input DM signal into a DC portion and a digital pulse portion, searching the digital pulse portion, starting from the DP final level, to detect DM data corresponding to a packet size and outputting the DM data; and serially merging the DP data and the DM data in such a manner that the DM data follows the DP data, and analyzing the serially merged data to generate analysis data.

In one embodiment, the measurement method further comprises temporarily storing the DP data of the input DP signal in a predetermined memory. Detecting the DP data can include defining a portion of the input DP signal that is higher than a first level but lower than a second level to be the DC portion. Detecting the DP data can include searching the digital pulse portion, starting from signal levels lower than the first level or higher than the second level, to detect the DP data corresponding to the packet size.

The measurement method can further comprise temporarily storing the DM data of the input DM signal in a predetermined memory. Detecting the DM data can comprise defining a portion of the input DM signal that is lower than a third level to be the DC portion.

In one embodiment, the measurement method further comprises temporarily storing the serially merged data in a predetermined memory. The analysis data can include eye diagram data about the serially merged data. The analysis data can include statistics of a crossover voltage of a rising pulse and a falling pulse with respect to the serially merged data. The analysis data can include statistics of rising time of the rising pulse and falling time of the falling pulse with respect to the serially merged data.

According to another aspect of the present invention, there is provided a measurement circuit comprising a DP signal detection unit, a final level output unit, a DM signal detection unit, a memory, and a signal analyzing unit. The DP signal detection unit divides an input DP signal into a DC portion and a digital pulse portion, detects DP data corresponding to a packet size from the digital pulse portion and outputs the DP data. The final level output unit detects a voltage level of final time from the DP data and outputs the voltage level as a DP final level. The DM signal detection unit divides an input DM signal into a DC portion and a digital pulse portion, searches the digital pulse portion, starting from the DP final level, to detect DM data corresponding to a packet size and outputs the DM data. The memory stores the DP data and the DM data. The signal analyzing unit reads the DP data and the DM data from the memory, serially merges the DP data and the DM data in such a manner that the DM data follows the DP data, and analyzes the serially merged data to generate analysis data.

In one embodiment, the DP signal detection unit includes a memory for temporarily storing the DP data of the input DP signal.

In one embodiment, the DP signal detection unit defines a portion of the input DP signal, which is higher than a first level but lower than a second level, to be the DC portion. In one embodiment, the DP signal detection unit searches the digital pulse portion, starting from signal levels lower than the first level or higher than the second level, to detect the DP data corresponding to the packet size.

In one embodiment, the DM signal detection unit includes a memory for temporarily storing the DM data of the input DM signal.

In one embodiment, the DM signal detection unit defines a portion of the input DM signal, which is lower than a third level, to be the DC portion.

In one embodiment, the signal analyzing unit includes a memory for temporarily storing the serially merged data.

In one embodiment, analysis data includes "eye diagram" data about the serially merged data.

In one embodiment, the analysis data includes statistics of a crossover voltage of a rising pulse and a falling pulse with respect to the serially merged data.

In one embodiment, the analysis data includes statistics of rising time of the rising pulse and falling time of the falling pulse with respect to the serially merged data.

BRIEF DESCRIPTION OF THE DRAWINGS

The foregoing and other objects, features and advantages of the invention will be apparent from the more particular description of preferred aspects of the invention, as illustrated in the accompanying drawings in which like reference characters refer to the same parts throughout the different views. The drawings are not necessarily to scale, emphasis instead being placed upon illustrating the principles of the invention. In the drawings, the thicknesses of layers are exaggerated for clarity.

DETAILED DESCRIPTION OF THE INVENTION

Figure 1:
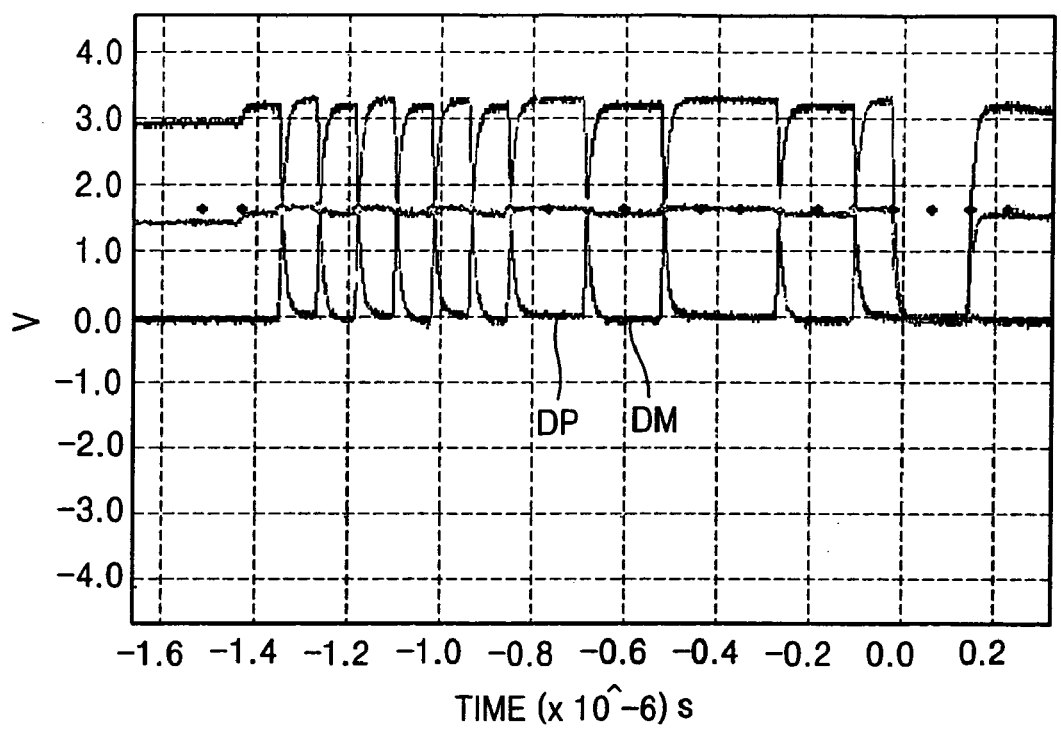
FIG. 1 shows signal waveforms displayed by a general measuring instrument.
Figure 2:
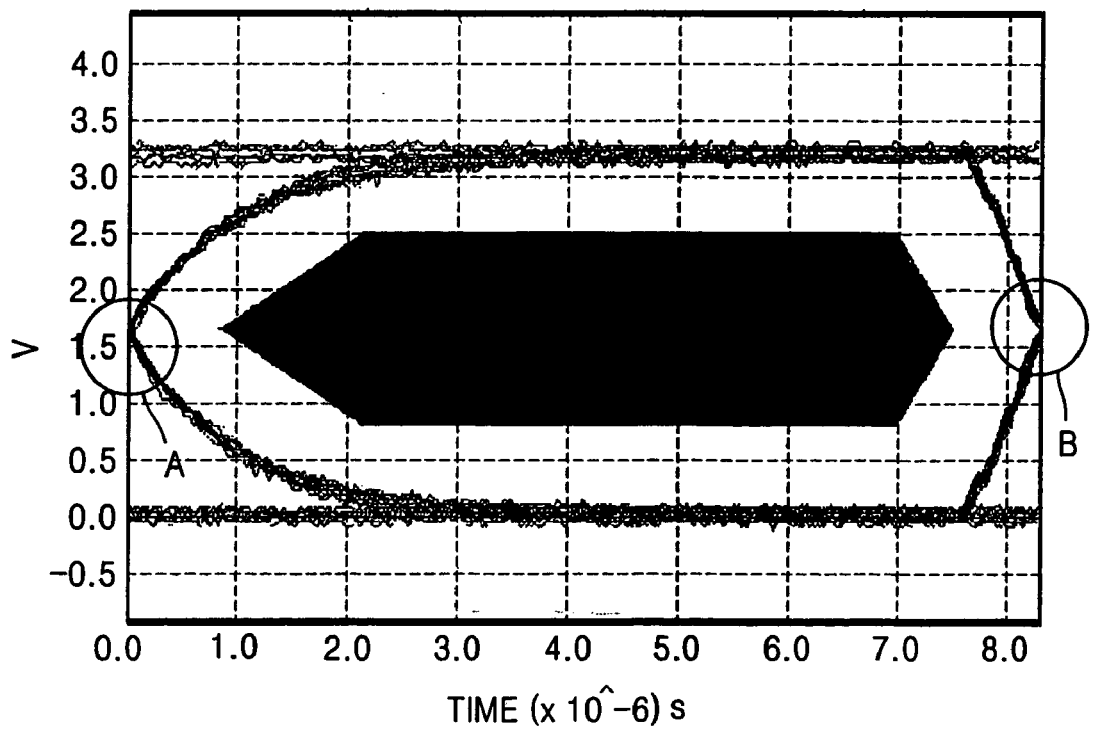
FIG. 2 is an eye diagram of the two signals of FIG. 1 when the signals are merged in parallel by the general measuring instrument.
Figure 3:
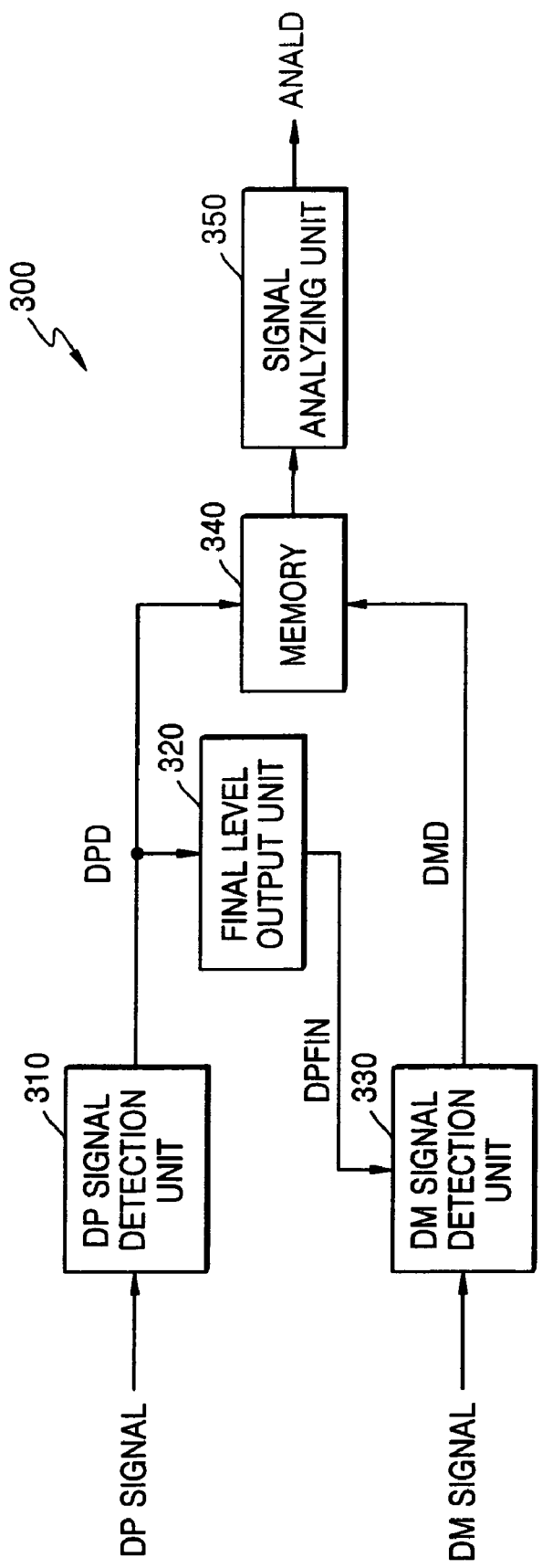
FIG. 3 is a block diagram of a measurement circuit according to an embodiment of the present invention.

FIG. 3 is a block diagram of a measurement circuit 300 according to an embodiment of the present invention. Referring to FIG. 3, the measurement circuit 300 includes a DP signal detection unit 310, a final level output unit 320, a DM signal detection unit 330, a memory 340, and a signal analyzing unit 350.

As described above, differential signals used in a high-speed serial data interface include a DP signal and a DM signal. When a transmitting system transmits transmission data in the form of the differential signals, a receiving system extracts the transmission data from a signal obtained by subtracting the DM signal from the DP signal. The measurement circuit 300 according to the present invention is used in probing single-ended signals with respect to the DP and DM signals in a full speed mode for transmitting 12 MHz data in a semiconductor device such as a USB 2.0 device to analyze the single-ended signals. That is, when automated test equipment (ATE) is used, since it is difficult to simultaneously display the two single-ended signals for a full speed mode test or display an eye diagram of the single-ended signal, the measurement circuit of the present invention separately probes the single-ended signals and merges the probed single-ended signals to analyze them.

The DP and DM signals are separately probed from a predetermined DUT such as a USB 2.0 device that outputs a differential signal in a predetermined system and the probed DP and DM signals are input to the measurement circuit 300. The DP signal detection unit 310 divides the input DP signal into a direct current DC portion and a digital pulse portion and detects digital DP data DPD corresponding to a packet size from the digital pulse portion. The packet size corresponds to the number of digital pulses of the digital pulse portion or pulses of specific time among the digital pulse portion. A user appropriately may select a signal period to be analyzed to set the packet size.

Figure 4A:
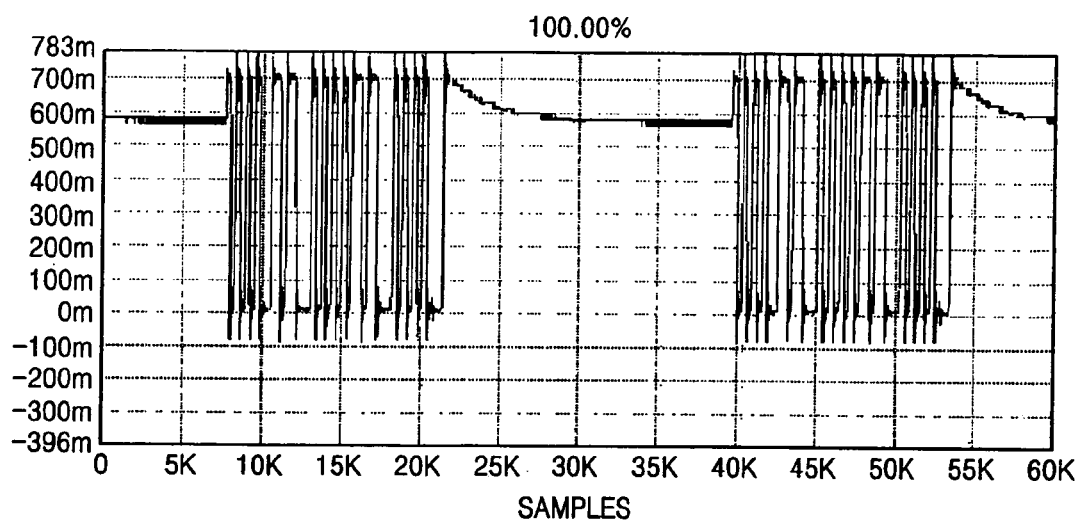
FIG. 4A shows the waveform of a probed DP signal.

FIG. 4A shows an example of the waveform of the probed DP signal. Referring to FIG. 4A, the DP signal input to the DP signal detection unit 310 has the DC portion and the digital pulse portion. The DP signal detection unit 310 can include a memory (not shown) for storing digital pulse obtained by sampling the DP signal through a predetermined sampling method. The DP signal detection unit 310 judges or defines a portion of the digital pulse, which is higher than a first level but lower than a second level, to be the DC portion. That is, the fact that the DC portion may be formed toward higher voltage than a middle level of the DP signal is used. For example, when a peak-to-peak voltage is 0.7V, as shown in FIG. 4A, the first and second levels can be 0.5V and 0.65V, respectively. The first and second levels can be appropriately set by the user.

Figure 4B:
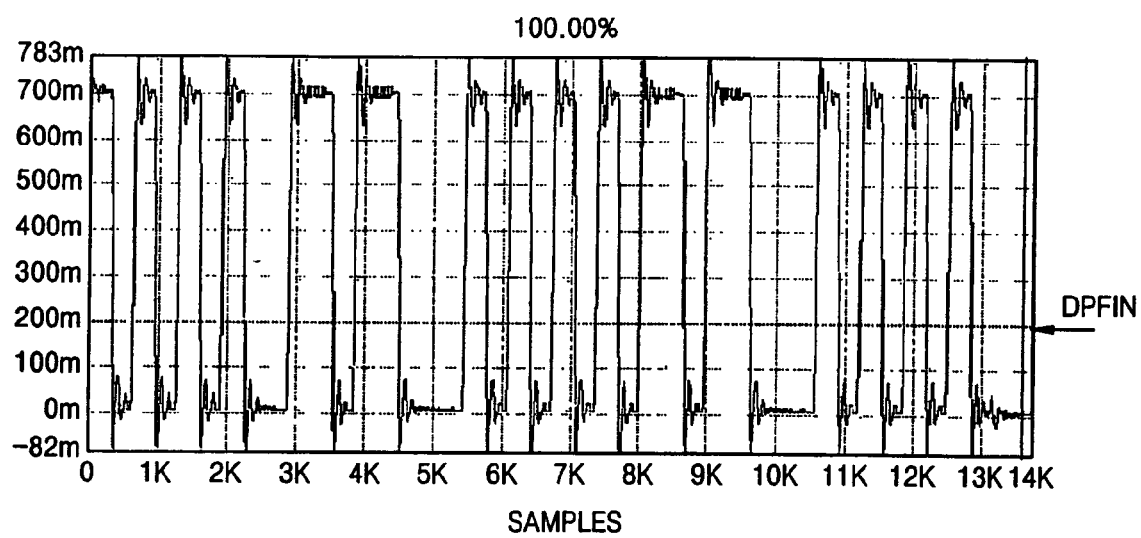
FIG. 4B shows the waveform of the digital pulse portion extracted from the waveform of FIG. 4A.

FIG. 4B shows the waveform of the digital pulse portion extracted from the waveform of FIG. 4A. The waveform of FIG. 4B represents the digital DP data DPD corresponding to the packet size, detected by the DP signal detection unit 310. The DP signal detection unit 310 searches the digital pulse portion, starting from levels lower than the first level or high than the second level, to detect the DP data DPD corresponding to the packet size.

The final level output unit 320 detects a voltage level of final time from the DP data DPD detected by the DP signal detection unit 310 and outputs it as a DP final level signal DPFIN. For instance, the DP final level DPFIN is 200 mV in FIG. 4B. When the final level output unit 320 detects the DP final level DPFIN corresponding to the final time from the packet size, the DM signal detection unit 330 detects DM data DMD to be serially merged with the DP data DPD using the DP final level DPFIN.

Specifically, the DM signal detection unit 330 divides the DM signal input to the measurement circuit 300 into a DC portion and a digital pulse portion and searches the digital pulse portion of the DM signal, starting from the DP final level DPFIN, to detect the digital DM data DMD corresponding to a packet size. Here, the packet size is equivalent to the number of digital pulses of the digital pulse portion or pulses corresponding to specific time among the digital pulse portion. The user appropriately selects a signal period to be analyzed to set the packet size. While the packet size for detecting the DM data DMD may be identical to the packet size for detecting the DP data DPD in this embodiment, they can be different from each other.

Figure 5A:
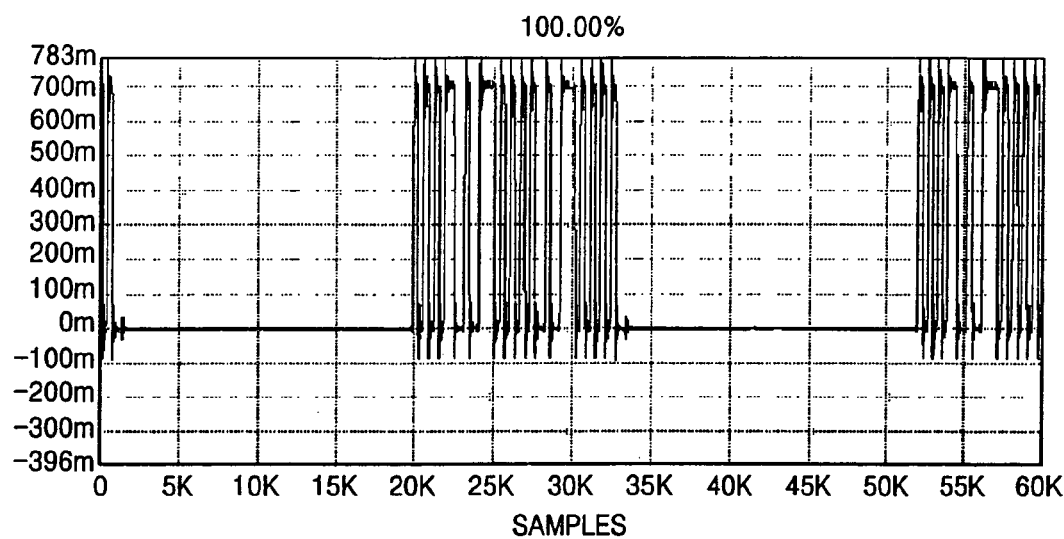
FIG. 5A shows the waveform of a probed DM signal.

FIG. 5A shows an example of the waveform of a probed DM signal. Referring to FIG. 5A, the DM signal input to the DM signal detection unit 330 has the DC portion and the digital pulse portion. The DM signal detection unit 330 can include a memory (not shown) for storing digital data obtained by sampling the DM signal through a predetermined sampling method. The DM signal detection unit 330 judges or defines a portion of the digital pulse, which is lower than a third level, for example, 0.3V, to be the DC portion. This is because the DC portion may be formed toward lower voltage than a middle level of the DM signal, as shown in FIG. 5A.

Figure 5B:
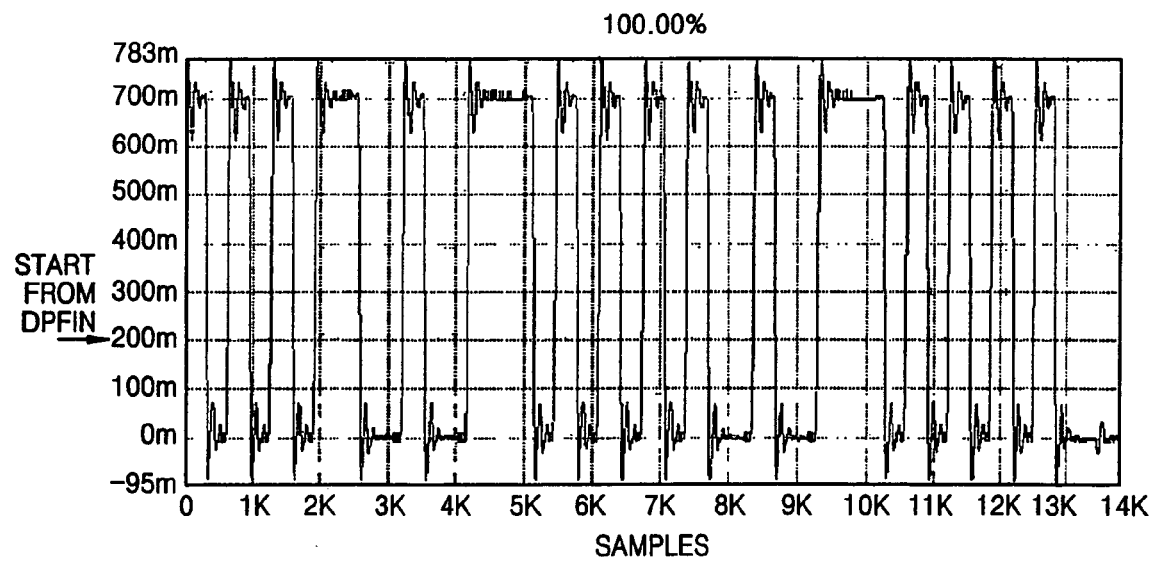
FIG. 5B shows the digital pulse portion extracted from the waveform of FIG. 5A.

FIG. 5B shows the waveform of the digital pulse portion extracted from the waveform of FIG. 5A. The waveform of FIG. 5B represents the digital DM data DMD corresponding to the packet size, detected by the DM signal detection unit 330. The DM signal detection unit 330 searches the digital pulse portion, starting from the DP final level DPFIN, to detect the DM data DMD corresponding to the packet size in order to prevent the DP data and the DM data from being distorted when they are merged with each other.

In FIG. 3, the memory 340 stores the DP data DPD detected by the DP signal detection unit 310 and the DM data DMD detected by the DM signal detection unit 330. The signal analyzing unit 350 reads the DP data DPD and the DM data DMD from the memory 340 and serially merges them in a manner that the DM data DMD follows the DP data DPD. In addition, the signal analyzing unit 350 analyzes the serially merged data to generate analysis data ANALD. The analysis data ANALD output from the signal analyzing unit 350 is displayed on a display such as a liquid crystal display such that the user can observe it.

Figure 6:
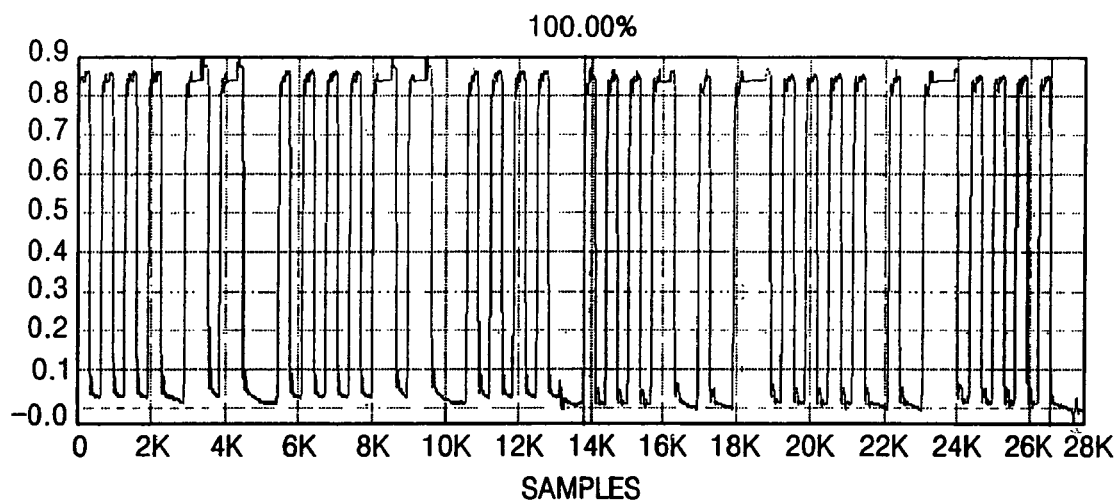
FIG. 6 shows the waveform of a signal obtained by serially merging the signals of FIGS. 4B and 5B.

FIG. 6 shows the waveform of a signal obtained by serially merging the signals of FIGS. 4B and 5B. The waveform of FIG. 6 is acquired by combining the DP data DPD that ends at the DP final level DPFIN with the DM data DMD that starts at the DP final level DPFIN, which is called "serially merged". The signal analyzing unit 350 can include a memory (not shown) for temporarily storing the serially merged data having the waveform of FIG. 6.

Figure 7:
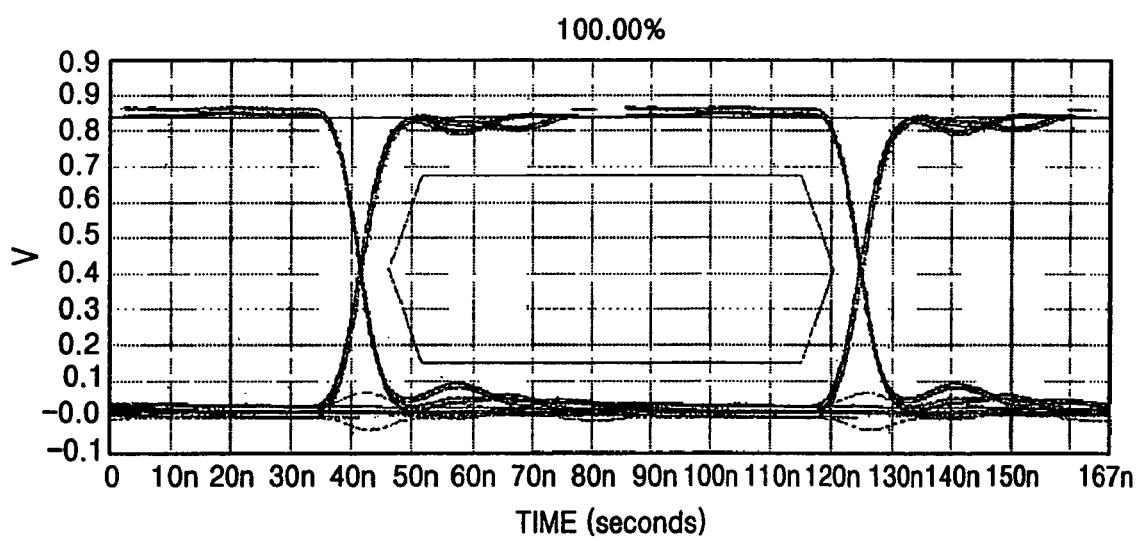
FIG. 7 is an eye diagram of the signals of FIGS. 4B and 5B when the signals are merged in parallel.

FIG. 7 is an eye diagram of the signals of FIGS. 4B and 5B when the signals are merged in parallel. The eye diagram of FIG. 7 represents a waveform obtained by dividing the signals of FIGS. 4B and 5B at a specific period and then overlapping the divided signals. Through the eye diagram of FIG. 7, the user can observe the states of the DP signal and the DM signal. From the overlapped signal waveform of the eye diagram of FIG. 7, the user knows a degree of jitter in the probed signals. Furthermore, the user can observe a crossover voltage at which the rising edge and the falling edge of each of the DP signal and the DM signal meet from the eye diagram of FIG. 7. From the rising edge and the falling edge of the eye diagram of FIG. 7, the rising time and falling time of each of the DP signal and the DM signal can be known. As described above, the analysis data ANALD output from the signal analyzing unit 350 includes eye diagram data about the serially merged data. In addition, the analysis data ANALD can include statistics such as an average of crossover voltages of rising pulses and falling pulses with respect to the serially merged data and statistics such as an average rising time of the rising pulses and an average falling time of the falling pulses with respect to the serially merged data.

As described above, to analyze two differential signals probed from a DUT, that is, the DP signal and the DM signal, the measurement circuit 300 according to the present invention detects the DP data DPD from which its DC portion has been removed and the DM data DMD from which its DC portion has been removed, stores the two data signals in the memory, and then serially merges the two data signals stored in the memory without distorting them. The measurement circuit divides the serially merged signal at a predetermined period and overlaps the divided signals to generate eye diagram data and analysis data including crossover voltages, rising time, falling time and so on.

The measurement circuit according to the present invention can be applied to a measuring instrument or ATE, which cannot merge two single-ended signals in parallel to generate an eye diagram, to generate the eye diagram of the single-ended signals output from a DUT and measure crossover voltages, rising time and falling time.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A measurement method comprising:
   dividing an input DP signal into a DC portion and a digital pulse portion, detecting DP data corresponding to a packet size from the digital pulse portion and outputting the DP data;
   detecting a voltage level of final time from the DP data and outputting the voltage level as a DP final level;
   dividing an input DM signal into a DC portion and a digital pulse portion, searching the digital pulse portion, starting from the DP final level, to detect DM data corresponding to a packet size and outputting the DM data; and
   serially merging the DP data and the DM data in such a manner that the DM data follows the DP data, and analyzing the serially merged data to generate analysis data.

2. The measurement method as claimed in claim 1, further comprising temporarily storing the DP data of the input DP signal in a predetermined memory.

3. The measurement method as claimed in claim 1, wherein detecting the DP data comprises defining a portion of the input DP signal that is higher than a first level but lower than a second level to be the DC portion.

4. The measurement method as claimed in claim 3, wherein detecting the DP data comprises searching the digital pulse portion, starting from signal levels lower than the first level or higher than the second level, to detect the DP data corresponding to the packet size.

5. The measurement method as claimed in claim 1, further comprising temporarily storing the DM data of the input DM signal in a predetermined memory.

6. The measurement method as claimed in claim 1, wherein detecting the DM data comprises defining a portion of the input DM signal that is lower than a third level to be the DC portion.

7. The measurement method as claimed in claim 1, further comprising temporarily storing the serially merged data in a predetermined memory.

8. The measurement method as claimed in claim 1, wherein the analysis data includes eye diagram data about the serially merged data.

9. The measurement method as claimed in claim 1, wherein the analysis data includes statistics of a crossover voltage of a rising pulse and a falling pulse with respect to the serially merged data.

10. The measurement method as claimed in claim 1, wherein the analysis data includes statistics of rising time of the rising pulse and falling time of the falling pulse with respect to the serially merged data.

11. A measurement circuit comprising:
- a DP signal detection unit for dividing an input DP signal into a DC portion and a digital pulse portion, detecting DP data corresponding to a packet size from the digital pulse portion and outputting the DP data;
- a final level output unit for detecting a voltage level of final time from the DP data and outputting the voltage level as a DP final level;
- a DM signal detection unit for dividing an input DM signal into a DC portion and a digital pulse portion, searching the digital pulse portion, starting from the DP final level, to detect DM data corresponding to a packet size and outputting the DM data;
- a memory for storing the DP data and the DM data; and
- a signal analyzing unit for reading the DP data and the DM data from the memory, serially merging the DP data and the DM data in such a manner that the DM data follows the DP data, and analyzing the serially merged data to generate analysis data.

12. The measurement circuit as claimed in claim 11, wherein the DP signal detection unit includes a memory for temporarily storing the DP data of the input DP signal.

13. The measurement circuit as claimed in claim 11, wherein the DP signal detection unit defines a portion of the input DP signal, which is higher than a first level but lower than a second level, to be the DC portion.

14. The measurement circuit as claimed in claim 13, wherein the DP signal detection unit searches the digital pulse portion, starting from signal levels lower than the first level or higher than the second level, to detect the DP data corresponding to the packet size.

15. The measurement circuit as claimed in claim 11, wherein the DM signal detection unit includes a memory for temporarily storing the DM data of the input DM signal.

16. The measurement circuit as claimed in claim 11, wherein the DM signal detection unit judges a portion of the input DM signal, which is lower than a third level, to be the DC portion.

17. The measurement circuit as claimed in claim 11, wherein the signal analyzing unit includes a memory for temporarily storing the serially merged data.

18. The measurement circuit as claimed in claim 11, wherein analysis data includes "eye diagram" data about the serially merged data.

19. The measurement circuit as claimed in claim 11, wherein the analysis data includes statistics of a crossover voltage of a rising pulse and a falling pulse with respect to the serially merged data.

20. The measurement circuit as claimed in claim 11, wherein the analysis data includes statistics of rising time of the rising pulse and falling time of the falling pulse with respect to the serially merged data.

* * * * *